United States Patent [19]
Nakamura et al.

[11] Patent Number: 5,476,426
[45] Date of Patent: Dec. 19, 1995

[54] FUEL INJECTION CONTROL SYSTEM

[75] Inventors: Kazuhiro Nakamura, Hamamatsu; Yuuji Moriwaki, Iwata, both of Japan

[73] Assignee: Yamaha Hatsudoki Kabushiki Kaisha, Iwata, Japan

[21] Appl. No.: 187,844

[22] Filed: Jan. 28, 1994

[30]    Foreign Application Priority Data

Jan. 28, 1993  [JP]  Japan ................ 5-031118

[51] Int. Cl.⁶ .................... F02D 41/04; F16H 61/00
[52] U.S. Cl. ................... 477/115; 477/165; 123/494
[58] Field of Search ..................... 123/478, 494, 123/492, 493, 488, 361, 399; 477/115, 165; 440/86, 87

[56]           References Cited
         U.S. PATENT DOCUMENTS

| | | | |
|---|---|---|---|
| 4,933,661 | 6/1990 | Oda et al. ................ | 123/494 |
| 4,979,117 | 12/1990 | Hattori et al. ............ | 123/494 |
| 5,036,817 | 8/1991 | Tomikawa et al. ....... | 123/399 |
| 5,040,515 | 8/1991 | Kako ......................... | 123/494 |
| 5,088,461 | 2/1992 | Ohashi et al. ............ | 123/399 |
| 5,168,849 | 12/1992 | Gerhardt et al. ........ | 123/494 |

*Primary Examiner*—Willis R. Wolfe, Jr.
*Attorney, Agent, or Firm*—Knobbe, Martens, Olson & Bear

[57]           ABSTRACT

An engine control system that relies upon throttle valve position and a throttle position detector. However, rather than measuring actual throttle valve detector output signals, a different signal is measured so that accurate positioning of the initial position of the throttle position detector is unnecessary.

23 Claims, 8 Drawing Sheets

5,476,426

FUEL INJECTION CONTROL SYSTEM

BACKGROUND OF THE INVENTION

This invention relates to an engine control system and more particularly to an improved fuel injection control system.

A wide variety of engine operations are controlled by a control logic that receives signals from one or more sensors that sense engine running or ambient conditions so as to provide more accurate control for the operation of the engine. Many of these controls require throttle position sensors which sense the position of the operator throttle control to determine the load or operator demand on the engine. Conventionally such types of sensors are potentiometer type of devices that are connected in some way to the throttle valve, throttle valve shaft or throttle actuator and which output a voltage signal indicative of the throttle control position.

These sensors can be quite accurate, but it is necessary to ensure that the initial setting of the sensor corresponds to the initial Setting of the throttle control member with which it is associated. Thus, when the sensor is assembled to the throttle control member it has been the practice to ensure accuracy in the relative positions of the wiper of the potentiometer and the member with which it is associated. This can be time consuming. Furthermore, even though the initial setting may be correct, the alignment may become disturbed when assembling it on the engine or during later servicing.

It is, therefore, a principal object of this invention to provide an improved control system and method for an engine.

It is a further object of this invention to provide an improved throttle position sensing mechanism and method for sensing the throttle condition for improving engine control.

It is yet a further object of this invention to provide an improved method and apparatus for sensing throttle valve position wherein initial alignment of the throttle position sensor and the throttle actuating member need not be accurately done.

SUMMARY OF THE INVENTION

This invention is adapted to be embodied in a control system and method for an internal combustion engine having an engine speed control member movable between extreme positions comprising an idle speed position and a full speed position. Sensor means are provided for producing a signal indicative of the position of the engine speed control member. Means are provided for controlling the engine in response to at least the position of the engine speed control member.

In accordance with an apparatus for practicing the invention, the signal from the sensor means at a given position of the speed control is measured and is compared with the signal at at least one of the extreme positions so as to determine the actual position of the sensor.

In accordance with a method for practicing the invention, a reading is taken on the output from the sensor when the speed control member is in one of its extreme positions and this reading is used to calculate a different signal from the instantaneous reading of the speed control member for control purposes.

DETAILED DESCRIPTION OF THE PREFERRED EMBODIMENTS OF THE INVENTION

Figure 1:
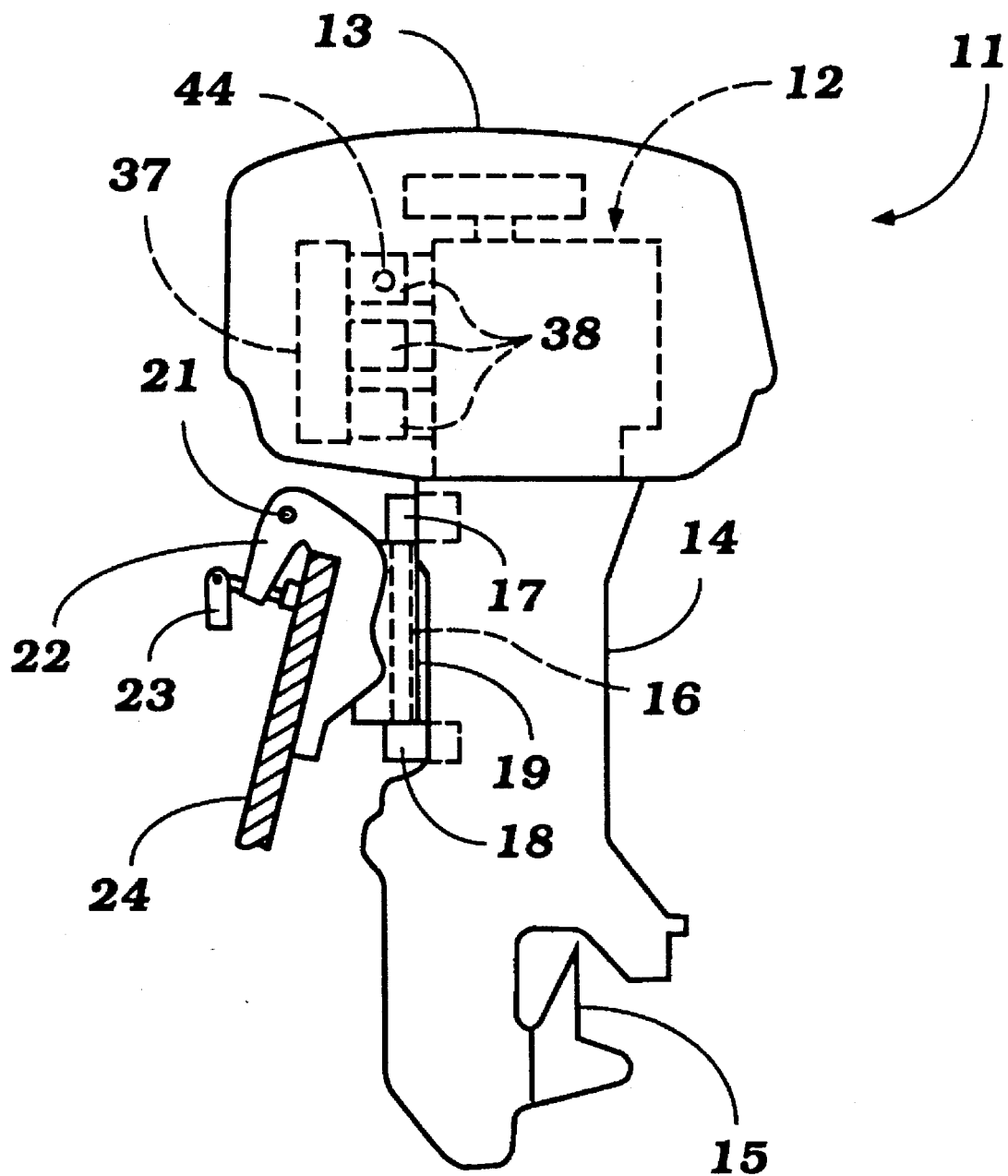
FIG. 1 is a side elevational view of an outboard motor constructed and operated in accordance with an embodiment of the invention.

Referring now in detail to the drawings and initially primarily to FIGS. 1–3 and 5, an outboard motor constructed and operated in accordance with an embodiment of the invention is identified generally by the reference numeral 11. The invention is described in conjunction with an outboard motor 11 because the invention deals primarily with a control system for an engine and outboard motors normally employ internal combustion engines as their power plants. It is to be understood and will be readily apparent to those skilled in the art, that the invention may be employed with a wide variety of other applications for internal combustion engines.

Referring now primarily to FIG. 1, the outboard motor 11 has a generally typical construction comprised of a power head having an internal combustion engine, indicated generally by the reference numeral 12 and a surrounding protective cowling, indicated generally by the reference numeral 13. The engine 12 will be described in more detail later by reference to the remaining figures of this group of figures.

As is well known with outboard motor practice, the engine 12 is supported within the power head so that its output shaft rotates about a vertically extending axis so as to drive a vertically disposed drive shaft (not shown in this figure) that depends into a drive shaft housing and lower unit 14 which depend from the power head. The drive shaft drives a propeller 15 of the lower unit through a forward neutral reverse transmission, which can be of any known type. As will become apparent as the description proceeds, both the speed of the engine 12 and the condition of this transmission may be controlled by a single lever remotely positioned control. However, and as will be described, the particular type of throttle and transmission control employed is not an essential feature of the invention.

A steering shaft 16 is affixed to the drive shaft housing lower unit 14 by means of upper and lower brackets 17 and 18 and is journaled for steering movement about a generally vertically extending steering axis within a swivel bracket 19. The swivel bracket 19 is, in turn, pivotally connected by means of a pivot pin 21 to a clamping bracket 22 for tilt and trim movement of the outboard motor 11. The clamping bracket 22 carries a clamping device 23 for detachable connection of the outboard motor 11 to a transom 24 of an associated watercraft as shown only partially and in cross section.

As has been noted, the foregoing description of the outboard motor 11 has been given only as a general application wherein the invention may be employed and that the invention may be employed in conjunction with other applications for internal combustion engines. For that reason, further details of the outboard motor 11 are not believed to be necessary to permit those skilled in the art to practice the invention.

Figure 2:
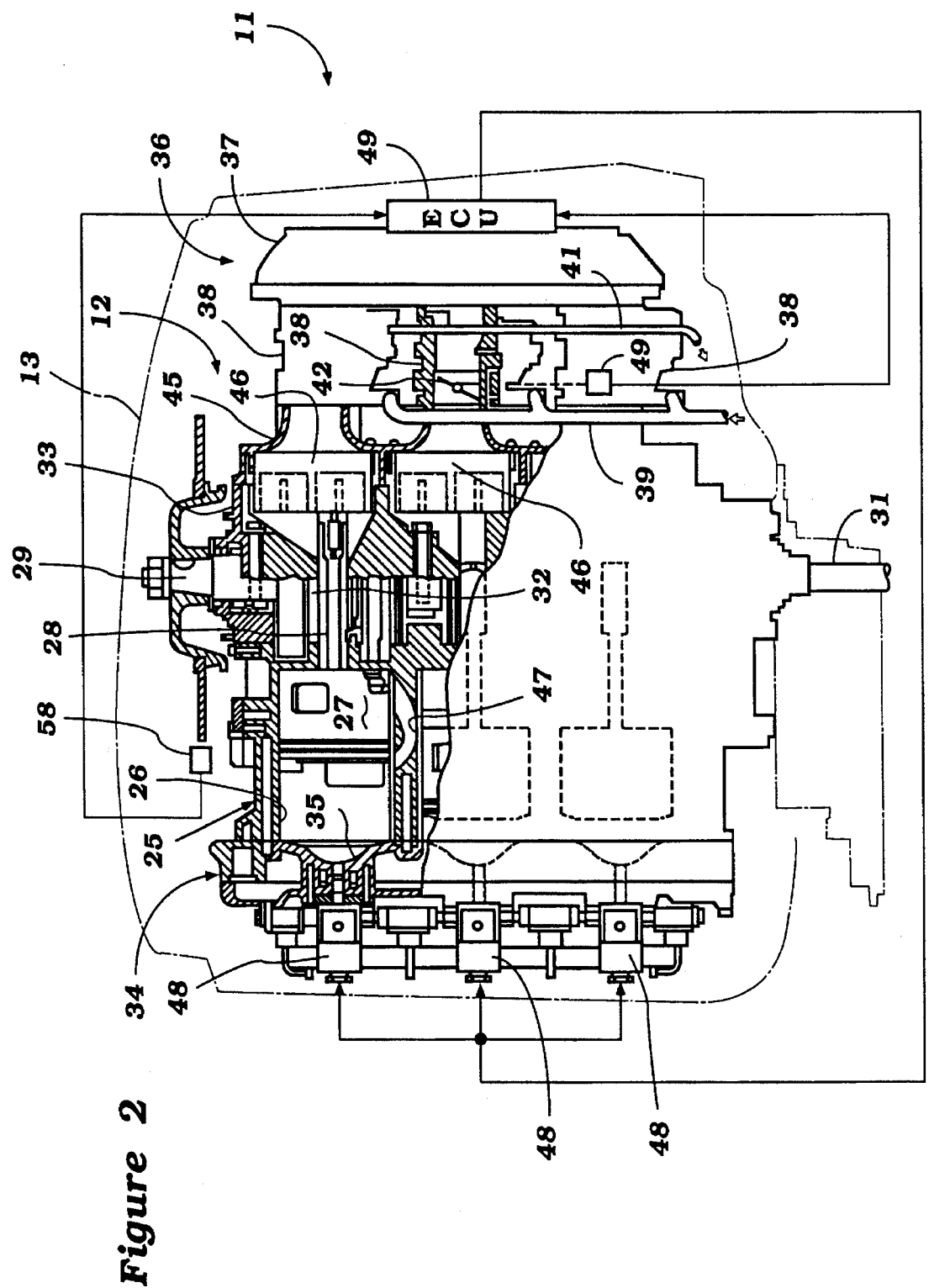
FIG. 2 is an enlarged side elevational view of the power head of the outboard motor, with the protective cowling being shown in phantom and a portion of the engine broken away to more clearly show its construction.

Referring now to FIG. 2, the details of the construction of the engine 12 necessary to permit those skilled in the art to understand the invention will be described. In the illustrated embodiment, the engine 12 is either of the three cylinder in-line type or may be of the V-6 type. In either event, only one bank of cylinders appears in this figure and it will be readily apparent to those skilled in the art how the invention may be employed with engines having other cylinder numbers or other configurations. In addition, although the invention is described in conjunction with a reciprocating engine, it will be readily apparent to those skilled in the art that the invention may also be employed with rotary type engines.

The engine 12 is provided with a cylinder block, indicated generally by the reference numeral 25 in which cylinder bores 26 are formed in a known manner. Pistons 27 reciprocate within the cylinder bores 26 and are connected by means of connecting rods 28 to a crankshaft 29. As has been previously noted, the crankshaft 29 is supported so that it rotates about a vertically extending axis for connection to the drive shaft which appears in this figure and is identified by the reference numeral 31. The crankshaft 29 is supported for rotation in any suitable manner and is disposed within a crankcase chamber 32.

In the illustrated embodiment, the engine 12 operates on a two-stroke crankcase compression principle and, therefore, the crankcase chambers 32 associated with each of the cylinder bores 26 are sealed from each other in a well known manner. The crankcase chambers 32 are formed by the cylinder block 25 and a crankcase member 33 which may be affixed to the cylinder block 25 in a well known manner.

A cylinder head assembly, indicated generally by the reference numeral 34 is affixed to the cylinder block 25 on the side opposite the crankcase member 33 and closes the cylinder bores 26. If the engine is of the V-type, there will be provided a cylinder head 34 for each bank of cylinders. The cylinder head 34 is formed with recesses 35 which cooperate with the cylinder bores 26 and pistons 27 to form the combustion chambers of the engine.

A charge is supplied to the crankcase chambers 32 of the engine 12 by an induction system, indicated generally by the reference numeral 36. This induction system includes an air inlet device 37 which draws atmospheric air from within the cowling 13. This atmospheric air is admitted to the interior of the cowling 13 through a suitable atmospheric inlet.

The air inlet device 37 silences the intake air and then delivers it to a plurality of throttle bodies, which in the illustrated embodiment are comprised of charge former 38 in the form of carburetors. In accordance with a preferred method of operation of the engine, the carburetors 38 supply a fuel air charge to the crankcase chambers 32 only under high-speed high-load conditions and supply air only under other running conditions. To this end, there is provided a fuel inlet manifold 39 that supplies fuel to the carburetors 38 and a return line 41 that returns excess fuel back to the fuel supply in a known manner. Under low-speed low-load conditions and under all conditions other than high-speed high-load, a valve (not shown) in the supply line 39 shuts off the flow of fuel to the carburetor 38 so that they will only supply air to the engine. Although the invention is described with a charge forming system of this type, it is to be understood that the invention may be utilized with other types of charge forming systems.

Figure 3:
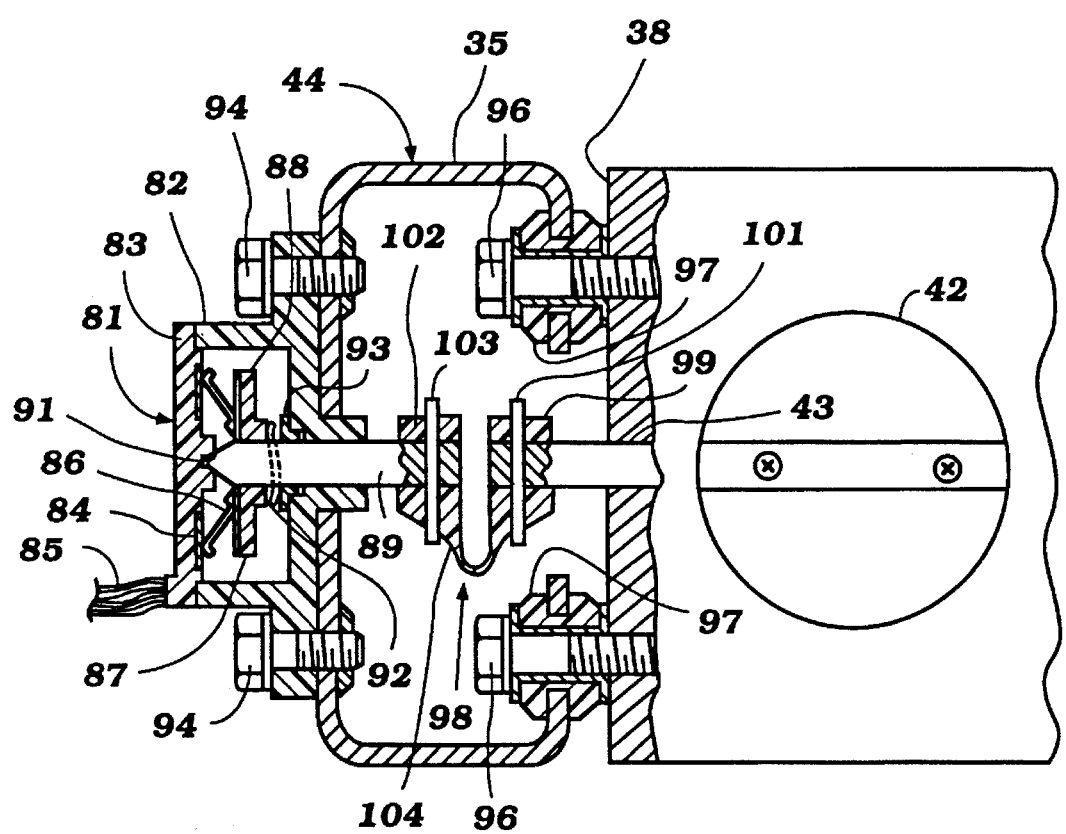
FIG. 3 is an enlarged cross-sectional view showing the inter-relationship between the speed control of the engine and the sensor for sensing the position of the speed control.

The carburetors 38 are each provided with a respective throttle valve 42 that is mounted on a throttle valve shaft 43 which is rotatably journaled within the respective carburetor 38 in a known manner and as is shown in FIG. 3. The throttle shafts 43 are all interconnected for simultaneous operation by means of a suitable linkage system and are remotely operated so as to control the position of the throttle valves 42 and the speed of the engine. A throttle position sensing mechanism, indicated generally by the reference numeral 44 associated with the throttle valve shaft 43 of one of the carburetors 42 so as to provide a signal indicative of throttle valve position. This sensing mechanism will be described later in more detail as it is associated with an important part of the invention although the particular type of throttle position sensor employed is not critical to the invention.

The charge from the carburetors 38 is admitted to the crank case chambers 32 through an intake manifold 45 in which reed-type check valve assemblies 46 are provided for each crankcase chamber 32. As is well known in the two-cycle crankcase compression art, the reed valves 46 permit the charge to enter the crankcase chambers 32 as the pistons 27 move upwardly in the cylinder bores 26 and close and preclude reverse flow when the pistons 27 move downwardly to compress the charge in the crankcase chamber 32.

The charge which is compressed in the crankcase chamber 32 is then transferred to the combustion chambers above the pistons 27 through a scavenging system including scavenge passages 47.

A fuel injector, indicated generally by the reference numeral 48 is mounted in the cylinder head assembly 34 and is associated with each cylinder head recess 35 for supplying fuel thereto. The injection system may include injectors 48 that inject only fuel or fuel air injectors. Also, as has been discussed previously, other forms of charge-forming systems may be employed to practice the invention.

The fuel injectors 48 are of the electrically operated type and have a solenoid valve that controls the discharge of fuel into the cylinder head recesses 35. This injection timing and duration is controlled by an ECU 49 which is mounted on the air inlet device 37 within the protective cowling 13. This provides protection for the ECU 49 against vibration and heat while positioning it in a convenient location for engine control. The control strategy will be described generally later.

Figure 5:
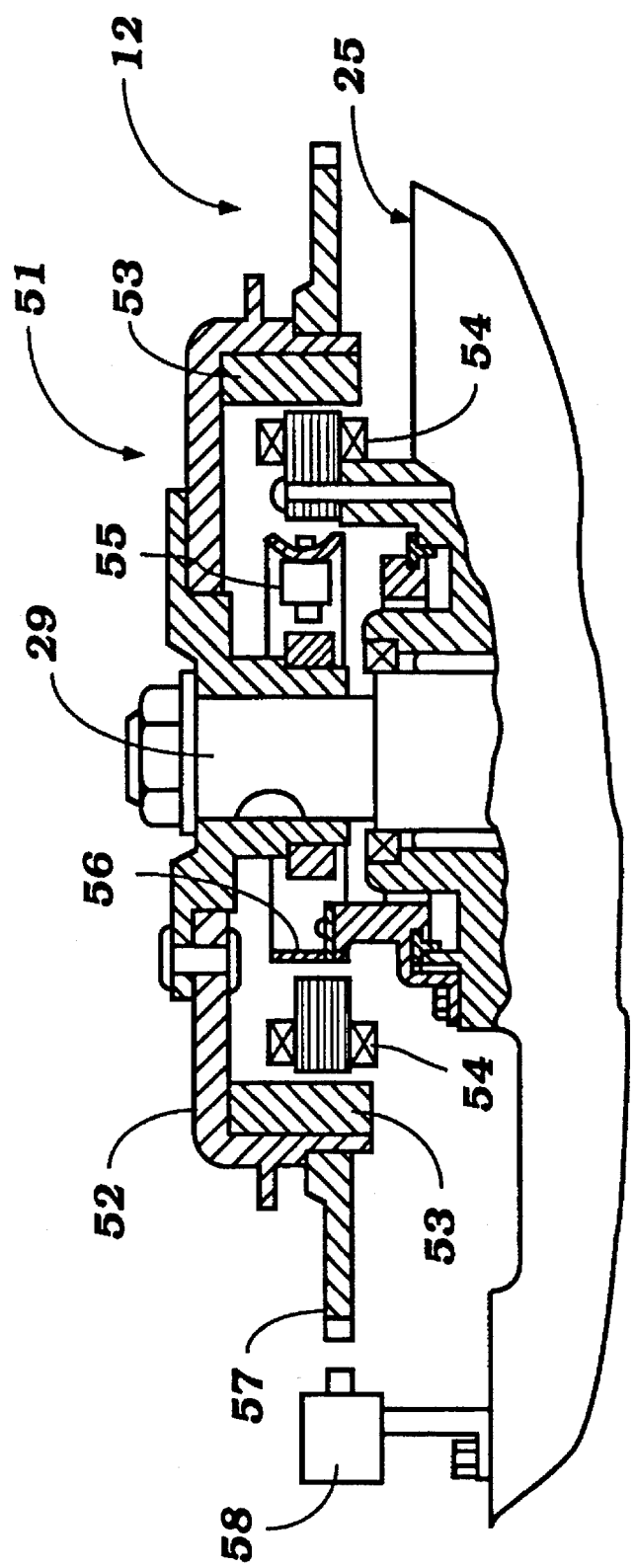
FIG. 5 is an enlarged cross-sectional view showing the flywheel magneto of the engine and certain components associated therewith.

The engine is also provided with an ignition system which does not appear in FIG. 2 but which includes a magneto generator type of arrangement, as shown in FIG. 5 and which is identified generally by the reference numeral 51. This magneto generator system includes a flywheel 52 that is affixed for rotation with the crankshaft 29 in a well known manner. Permanent magnets 53 are affixed to the interior of the flywheel 53 and cooperate with one or more charging coils 54 mounted in fixed relationship on the cylinder block 25 in proximity to the flywheel 52. These charging coils supply a charge to the ignition system and also a charge to a battery charging system, if desired.

There is further provided a pulser coil 55 that is mounted on a timing plate assembly 56 and which can be rotatably positioned in response to the positioning of the throttle valves 42 and the throttle valve shafts 43 through any known linkage system. The pulser coil 55 provides a triggering signal to the ignition system which may be of any known type such as the capacitive discharge type.

The flywheel 52 also has a starter gear portion 57 that has teeth which are engaged by a starter motor (not shown except schematically in FIG. 4) for electrical starting of the engine. These teeth also cooperate with a pulser coil 58 which is mounted on the cylinder block 25 and which provides a signal indicative of the angular position of the crankshaft 26 to the ECU 49 for control purposes.

Figure 6:
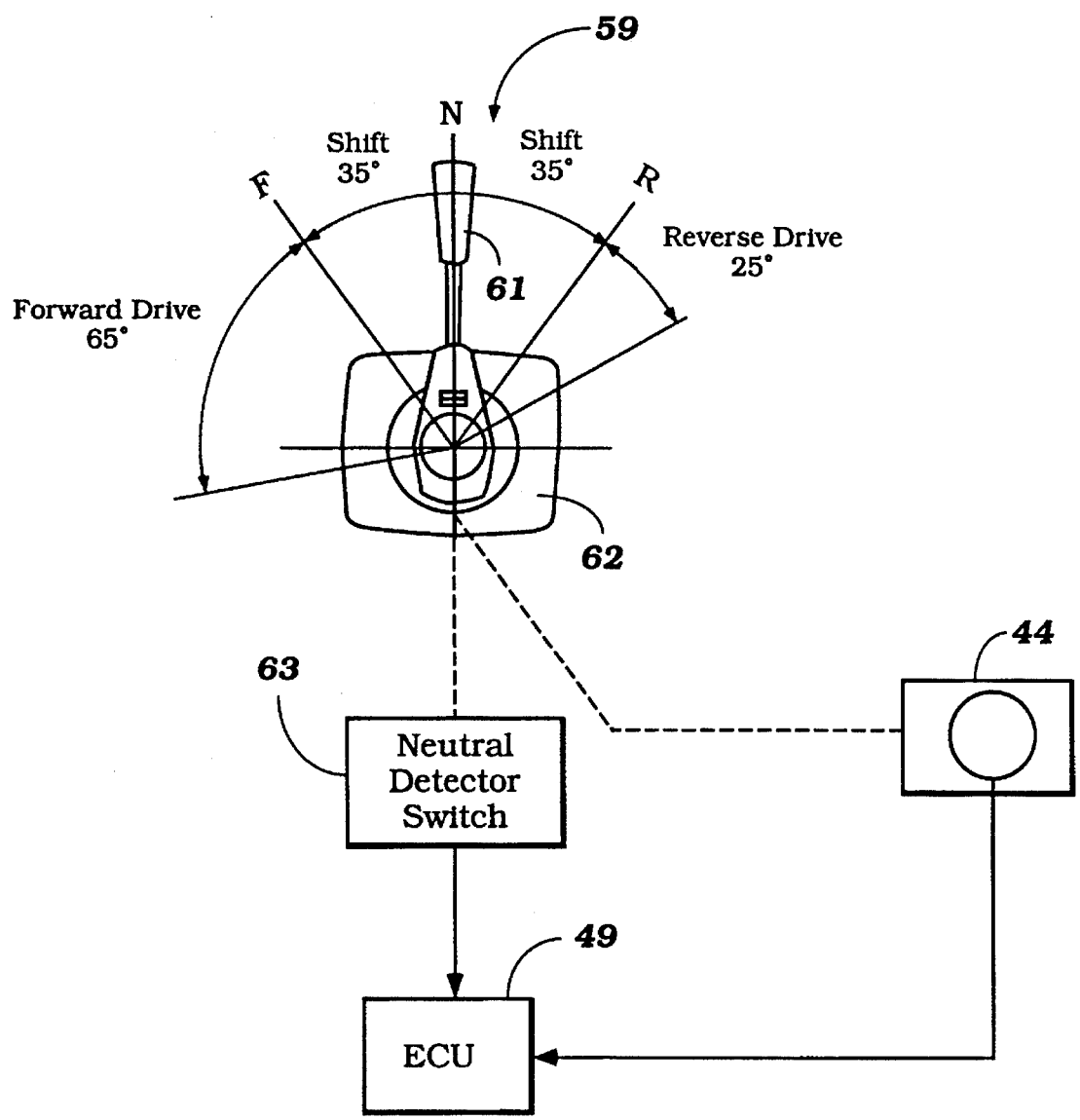
FIG. 6 is a partially schematic view showing the relationship between the single lever control and certain components of the fuel injection control.

It has been noted that the throttle valves 42 are operated by a remotely positioned linkage in a known manner. In a specific embodiment of the invention, this linkage includes a so-called "single lever control," shown in detail in FIG. 6 and identified generally by the reference numeral 59. This single lever control mechanism is well known in the art and includes a control lever 61 that is mounted on a base assembly 62 and is rotatable about an axis as shown in this figure. This single lever control from the control lever 61 is transmitted through a pair of bowden wire actuators, one of which operates the throttle valve 42 and the other of which operates the transmission mechanism in the lower unit for selectively driving the propeller 15 in forward or reverse directions. As is well known with this type of mechanism, when the single lever control 61 is in its neutral position as shown in FIG. 6, the transmission will be shifted into neutral and the engine will be run at its idle speed. If the operator wishes to shift into forward or reverse, he may move the lever 61 in either the forward shift position or the reverse shift position for a certain range of movement. In the illustrated embodiment, this constitutes approximately 35° of movement in either direction. If the movement is equal to that amount, the transmission will then be shifted into forward or neutral depending upon the direction of movement. Normally this is accomplished with no increase in speed of the engine. However, once the shift has been completed, further pivotal movement of the control level 61 will cause an increase of speed of the engine and in the speed of the boat. In order to limit the speed in reverse, the throttle can only be opened through the final 25° of movement in the reverse mode while 65° of movement is permitted within the forward mode. In this way, the maximum speed in reverse is restricted.

The single lever control 59 includes a switch, indicated generally by the reference numeral 63 which indicates when the shift lever 61 is in the neutral position and when it has been moved from the neutral position to establish either a forward or reverse drive. This mechanism is employed in conjunction with the ECU control 49 for the control for the engine including the control of the fuel injectors 48. It is to be understood also that the ECU 49 will control the firing of the spark plugs and other engine function as may be desired and required.

Figure 4:
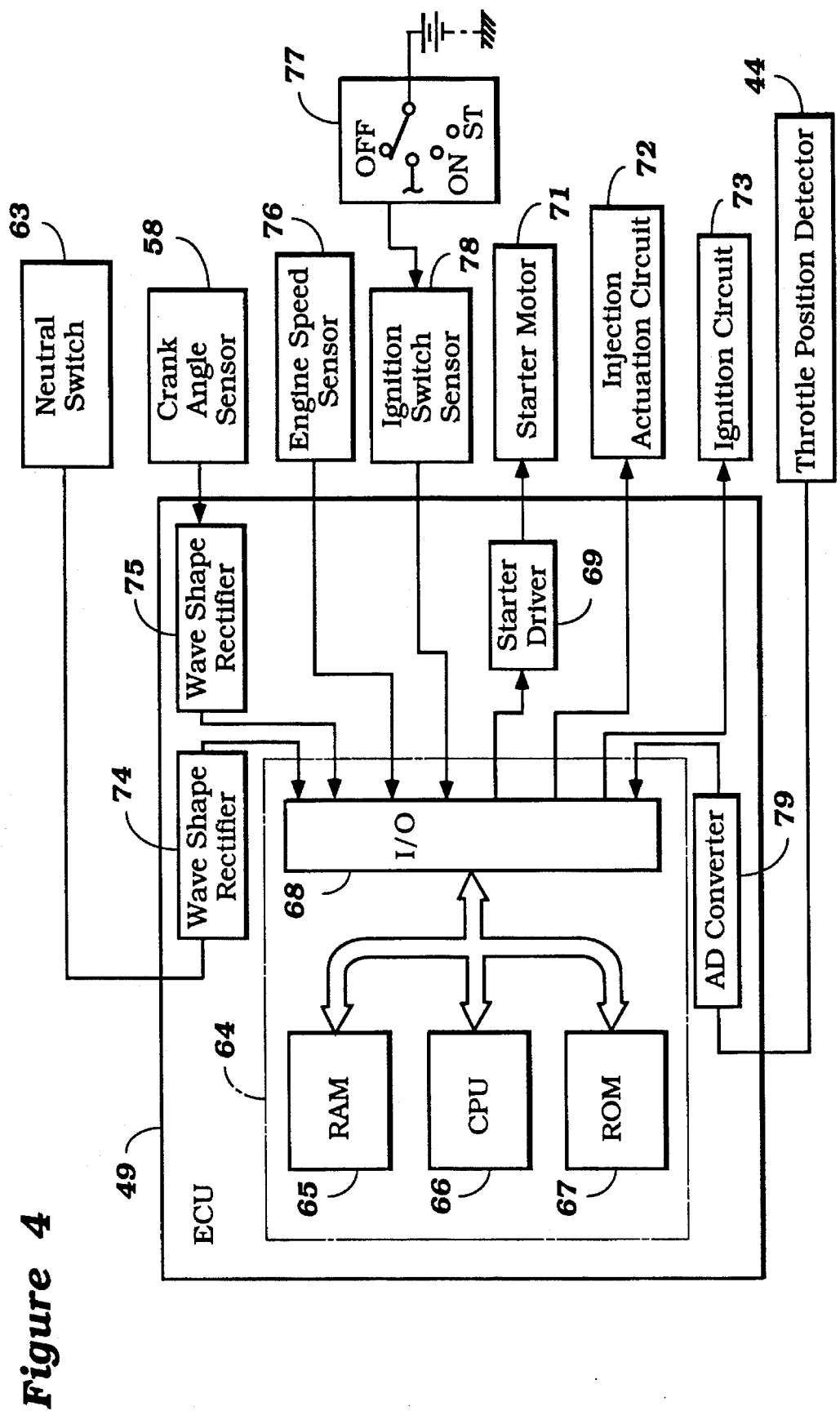
FIG. 4 is a block diagram showing the components of the engine control system.

The components of the system and their interrelationship may be best understood by reference to FIG. 4 wherein certain of the components already described are illustrated schematically and additional components are also illustrated schematically. The ECU 49 includes a control logic section 64 that includes a random access memory (RAM) 65, CPU 66, and a read only memory (ROM) 67. These units interchange information and output this information and receive information from an input/output circuit 68. The input/output circuit outputs controls from a starter drive 69 to a starter motor 71 which, as has been noted, is associated with the teeth 57 of the flywheel 51 for starting of the engine 12. In addition, the input/output transmit control signals to the ignition actuating circuit 72 that controls the amount and duration of fuel injected by the fuel injectors 48. In addition, this circuit may also control the valve that causes the carburetor 38 to begin supplying fuel. If a system is employed only using a carburetor or carburetors, the circuit 72 may also control the amount of fuel supplied by the carburetors.

Finally, the input/output 68 of the ECU 49 controls the ignition circuit of the engine, shown schematically at 73, so as to control the time at which the spark plugs are fired.

The input/output 67 also receives certain information from the detectors already noted and this includes the neutral switch 63 which supplies its signal to a wave-shape rectifier circuit 74 of the ECU 49 so as to provide the desired wave shape for transmission to the input/output 68. In addition, the crank angle sensor 58 outputs information to a wave-shape rectifier circuit 75 of the ECU for transmission of signals to the input/output 68 indicative of crankshaft angle.

An engine speed sensor, indicated generally at 76 and which may comprise the output from the pulser coil 55 of the magneto generator system 51 outputs a signal directly to the input/output 68 indicative of engine speed.

The outboard motor is also provided with a main switch 77 which in addition to performing an on/off switching function also is switchable to a start position and outputs its signal to an ignition switch sensor 78 which then outputs the information to the input/output 68. When the switch 77 calls for starting of the engine, this will be detected by the CPU 66 and the starter driver circuit 69 will be energized so as to initiate operation of the starter motor 71.

The final input to the input/output in the illustrated embodiment is that of the position of the throttle valve as determined by the throttle position detector 44 which outputs its signal to an analog-to-digital converter 79 which outputs digital signals of the throttle position to the input/output 68 for processing to control the ignition circuit and the injection circuit in a manner which will be described.

The construction of the throttle position detector 44 will now be described by particular reference to FIG. 3. Basically the throttle position detector 44 is comprised of a potentiometer, indicated generally by the reference numeral 81 and which is comprised of a housing assembly made up of a main housing portion 82 to which a cover plate 83 is affixed in any suitable manner. The cover plate 83 carries a variable resistor winding or disk 84 that is connected to the analog-to-digital converter 79 through a cable assembly 85. A wiper 86 is formed on a conductive plate 87 that is affixed to an insulating plate 88 which is carried on a wiper shaft 89. The wiper shaft 89 has an end portion that is journaled within a bearing 91 formed on the cover plate 83. A wave washer 92 is loaded between a bearing 93 carried by the housing piece 82 and the insulating disk 88 so as to hold the wiper 86 in engagement with the winding or disk 84.

The potentiometer assembly 81 is affixed by means of threaded fasteners 94 to a further housing piece 95 which is, in turn, affixed to one of the carburetor bodies 38 by threaded fasteners 96 with interposed elastomeric isolators 97. The wiper shaft 89 is connected to the throttle shaft 43 by means of a flexible coupling, indicated generally by the reference numeral 98 which includes a first portion 99 that is staked by a pin 101 to the throttle valve shaft 43 and a second portion 102 that is staked by a pin 103 to the wiper shaft 89. The portions 99 and 102 are interconnected to each other by a flexible portion 104 that will transmit rotation but permit some axial misalignment.

As has been previously noted, the mounting of the throttle position detector 44 and specifically the potentiometer 81 can be critical to the engine control wherein various engine control functions are controlled in response to throttle valve position. These include both the ignition system 73 and the injection system 72. Thus, if there is any misalignment in the position of the throttle position detector 44 and the actual throttle valve 42 inaccurate engine control can result.

Even if great care is practiced when initially installing the throttle position detector 44 on the carburetor 38, subsequent use may cause misalignments to occur. The control system, now to be described, includes an arrangement for permitting variations in the mounting of the throttle position detector 44 or subsequent misalignment to be compensated for in the actual measuring system for the throttle valve position so that inaccuracies will not adversely effect performance.

This system will now be described by particular reference to the control routines of FIGS. 7 and 8. However, before referring to those figures in detail, the control logic will be described. Basically, the system operates by providing an arrangement wherein the position of the wiper switch 89 is determined at a time when the throttle valve 42 is in one of its extreme positions, the idle position in the described embodiment. Thus, rather than setting a zero position, a reading is taken at the time when the throttle valve 42 is in this extreme position and then a difference signal is measured from the actual output of the potentiometer 81 at the exact running condition which determines the control for the injection circuit and/or ignition circuit. Thus, a difference signal rather than an absolute signal is employed for the control purposes.

The system operates so as to determine when the shift lever 61 is in its neutral position and it will be determined that at this position the throttle valve 42 is also positioned in its idle position so the output of the potentiometer 81 at this condition is taken as the base value from which the actual throttle openings can be determined by subsequent readings of the position of the wiper shaft 89 which will be indicative of the amount of opening of the throttle valve 41 from its idle position.

Figure 7:
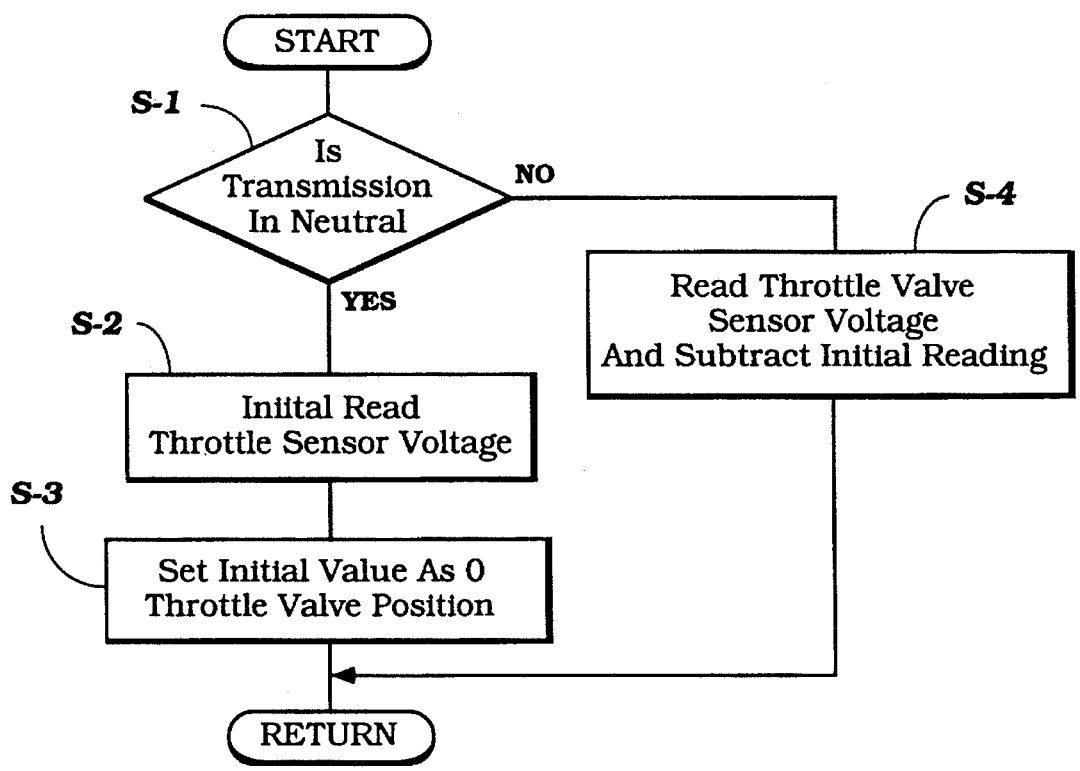
FIG. 7 is a block diagram showing a control routine for initially setting the throttle control position mechanism.
Figure 8:
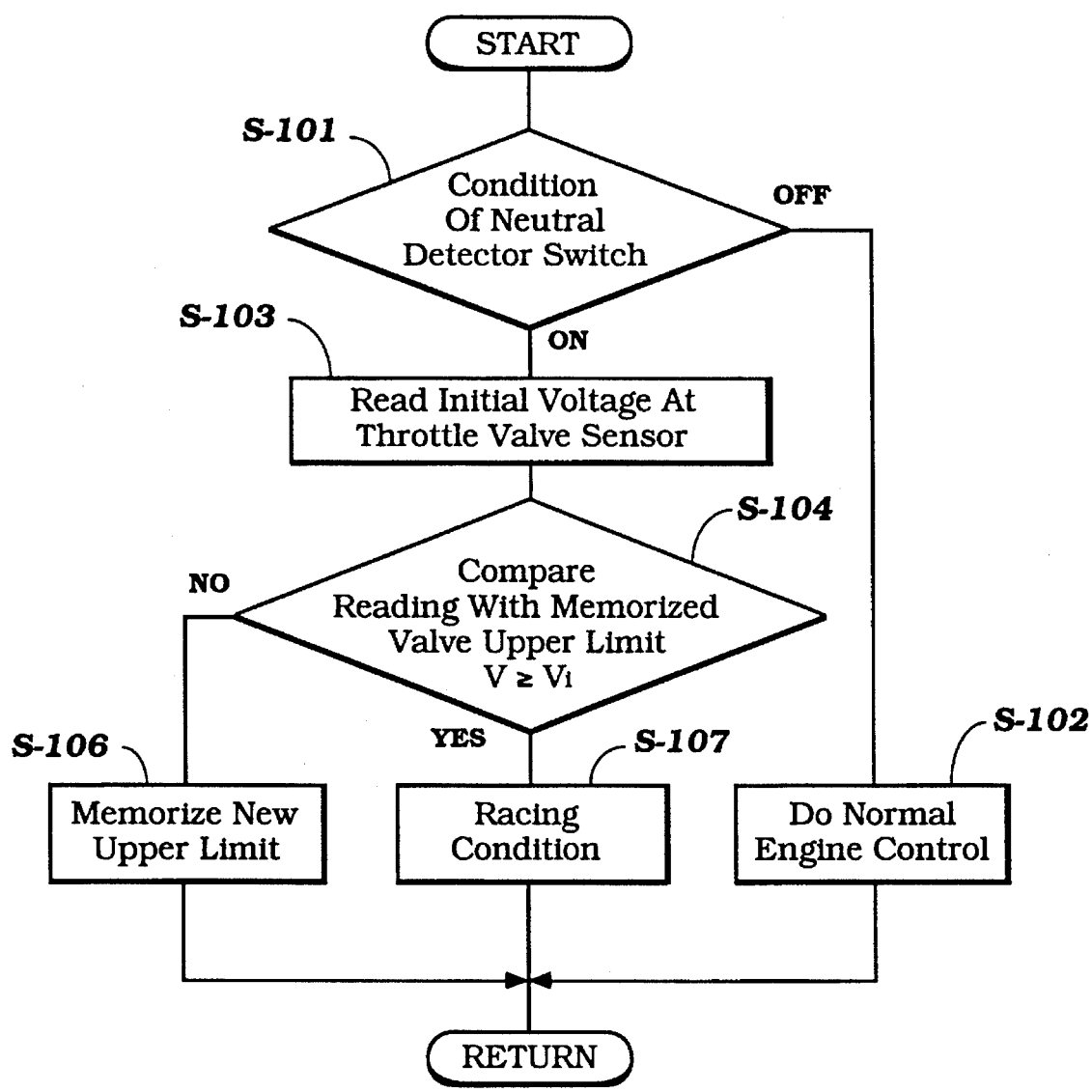
FIG. 8 is a block diagram showing another control routine that can be employed to update the information.

Referring now to FIG. 7, this shows the control routine for setting the initial position of the throttle valve 42 to its reference value when it is determined to be in its idle or closed position. The program starts and moves to the step S1 to determine if the neutral detector switch 63 indicates that the shift lever 61 is in neutral or has initially been moved to either the forward or reverse shift positions but has not yet reached these positions. Assuming that the engine 12 has been first started up, the shift lever 61 must be in the neutral position due to the starting interlock and the program will then move to the step S2 so as to read the initial output signal from the potentiometer 81 which is thus determined as the initial idle throttle valve position. The program then moves to the step S3 so as to set this value as the base value which will be subtracted from all future readings to determine actual throttle valve position. This figure is then memorized by the minimum value updating memory mechanism installed on the RAM 65 of the CPU 66.

The program then returns and again at the step S1 determined if the shift control lever 61 is still in the neutral position as determined by the neutral detector 63. Assuming the operator has now completed a shift to forward or reverse and has speeded up the engine 12 by opening the throttle valve 42, the program will then move to the step S4 so as to read the instantaneous output from the potentiometer 81 at the step S4. The initial throttle valve position memorized at the step S3 is then subtracted from this to determine the degree of throttle opening and this reading is then used so as to control either or both of the fuel injection actuation circuit 42 and the ignition circuit 73.

The actual control for either the injection circuit 72 or ignition circuit 73 may follow any control routine employing the running conditions measured by the sensors already described and any other additional sensors of engine running conditions or ambient conditions, as are well known in this art.

With the system as thus far described, it is possible not only to ensure accuracy in the determination of the actual throttle valve position without having to accurately set the throttle position detector 44 but it is also possible to use the logic in order to determine if there has been some deterioration in the system that causes the initial throttle valve setting to differ or to determine if the throttle valve is in an opened or racing condition. This is done by memorizing the initial throttle valve zero positioning of FIG. 7 as a voltage signal $V_i$ which is determined as the upper limit of the initial throttle valve position. The program can then follow a routine as shown in FIG. 8 so as to update this information if necessary or also so as to determine if the engine is in an open throttle valve racing condition. This control routine begins and then at the step S101 determines the condition of the neutral detector switch 63 at the step 101. If the neutral detector switch is off and the transmission is out of neutral, then the program moves to the step S102 to do the normal engine control routine following the routine of FIG. 7.

If, however, at the step S101 it is determined that the transmission is in neutral as sensed by the neutral detector switch 63, then the program moves to the step S103 so as to read the initial voltage output from the potentiometer 81, again assuming that the throttle valve is in its idle position. The program then moves to the step S104 to verify whether the voltage output V of the potentiometer 81 is equal to or greater than the previously memorized initial throttle valve setting $V_i$. If the value is greater then it is assumed that the step S105 that the engine is in a racing condition and the program returns.

If, however, at the step S104 it is determined that the potentiometer outputs a voltage that is less than the previously set voltage $V_i$, the program then moves to the step S106 so as to determine that there has been some deterioration in the system and the idle throttle valve position of the detector relative to the actual throttle valve has changed and this new voltage measurement V is memorized at the step 106 and substituted for the previous memorized value $V_i$ for all subsequent normal engine controls in accordance with the routine of FIG. 7.

It should be readily apparent from the foregoing description that the described construction permits very accurate engine control by determining throttle valve position not in response to an absolute value but in response to a difference from an extreme known value of the throttle valve position. This way the system can be constantly upgraded without readjustment of the throttle position detector. As has been noted, the system is used primarily in this embodiment for fuel injection control but it also can be employed for other engine controls such as ignition control, etc. It is also to be understood that the foregoing description is that of preferred embodiments of the invention and various changes and modifications may be made without departing from the spirit and scope of the invention, as defined by the appended claims.

We claim:

1. A control for an internal combustion engine having an engine speed control member movable between extreme positions comprising an idle speed position and a full speed position, an operator controlled member movable between an idle speed position and a full speed position and operatively connected to said engine speed control member for positioning said engine speed control member in response to operator demand, sensor means for providing a signal indicative of the position of said speed control member when said operator controlled member is in one of its extreme positions, and means for controlling said engine in response to at least the position of said engine speed control member by detecting the difference in signal from said sensor means at a given position of the speed control member and the signal at at least one of said extreme positions.

2. The control for an internal combustion engine as defined in claim 1, wherein the engine speed control member comprises a throttle valve.

3. The control for an internal combustion engine as defined in claim 1, wherein the engine speed control member comprises a fuel control for supplying fuel to the engine.

4. The control for an internal combustion engine as defined in claim 3, wherein the means for controlling the engine reads and the output of the sensor means at a time when it is determined that the engine speed control member will be in the extreme position.

5. The control for an internal combustion engine as defined in claim 4, wherein the extreme condition is the idle speed position.

6. The control for an internal combustion engine as defined in claim 1, wherein the extreme condition is the idle speed position.

7. The control for an internal combustion engine as defined in claim 6, wherein the position of the operator controlled member is measured at starting to determine the idle speed position.

8. The control for an internal combustion engine as defined in claim 7, further including means for updating the extreme position signal memorized during subsequent return of the operator controlled member to its idle position.

9. A control for an internal combustion engine as set forth in claim 6, wherein the engine drives a transmission movable between a neutral position and a drive position and the operator controlled member is operative to move the transmission between its neutral condition when the operator controlled member is in its idle speed position and its forward drive position as the operator controlled member moves from its idle speed position toward its full speed position.

10. A control for an internal combustion engine as set forth in claim 9, further including means for starting the engine and wherein the means for starting the engine is operative to start the engine only when the operator controlled member is in its idle speed position.

11. A control for an internal combustion engine as set forth in claim 10, wherein the position of the operator controlled member is measured at starting to determine the idle speed position.

12. A control method for an internal combustion engine having an engine speed control member movable between extreme positions comprising an idle speed position and a full speed position, an operator controlled member movable between an idle speed position and a full speed position and operatively connected to said engine speed control member for positioning said engine speed control member in response to operator demand, sensor means for providing a signal indicative of the position of said engine in response to at least the position of said engine speed control member, said method comprising the steps of determining when the operator controlled member is in an extreme position and measuring the output signal of the sensor means, thereafter detecting the signal from the sensor means and detecting the difference in signal from said sensor means at a given position of the speed control member and the signal at at least one of said extreme positions.

13. The control method for an internal combustion engine as defined in claim 12, wherein the engine speed control member comprises a throttle valve.

14. The control method for an internal combustion engine as defined in claim 12, wherein the engine speed control member comprises a fuel control for supplying fuel to the engine.

15. The control method for an internal combustion engine as defined in claim 14, wherein the sensor means is read at a time when it is determined that the engine speed control member will be in the extreme position.

16. The control method for an internal combustion engine as defined in claim 15, wherein the extreme condition is the idle speed position.

17. The control method for an internal combustion engine as defined in claim 16, wherein the position of the operator control is measured at starting to determine the idle speed position.

18. The control method for an internal combustion engine as defined in claim 11, wherein the output of the sensor means is initially read at a time when it is determined that the engine speed control member will be in the extreme position.

19. The control method for an internal combustion engine as defined in claim 18, wherein the extreme condition is the idle speed position.

20. The control method for an internal combustion engine as defined in claim 19, wherein the position of the operator control is measured at starting to determine the idle speed position.

21. The control method for an internal combustion engine as defined in claim 20, further updating the extreme position signal memorized during subsequent return of the operator controlled member to its idle position.

22. The control method for an internal combustion engine as defined in claim 19, wherein the engine drives a transmission movable between a neutral position and a drive position and the operator controlled member is operative to move the transmission between its neutral condition when the operator controlled member is in its idle speed position and its forward drive position as the operator controlled member moves from its idle speed position toward its full speed position.

23. The control method for an internal combustion engine as defined in claim 22, further including means for starting the engine and wherein the means for starting the engine is operative to start the engine only when the operator controlled member is in its idle speed position.

* * * * *